United States Patent
Okada

(10) Patent No.: US 8,643,878 B2
(45) Date of Patent: Feb. 4, 2014

(54) IMAGE FORMING APPARATUS, INFORMATION PROCESSING APPARATUS, COMPUTER READABLE MEDIUM AND IMAGE FORMING SYSTEM

(75) Inventor: Shigeru Okada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 627 days.

(21) Appl. No.: 12/880,832

(22) Filed: Sep. 13, 2010

(65) Prior Publication Data

US 2011/0235100 A1    Sep. 29, 2011

(30) Foreign Application Priority Data

Mar. 24, 2010   (JP) .................................. 2010-068140

(51) Int. Cl.
*G06F 15/00*    (2006.01)
(52) U.S. Cl.
USPC ........... 358/1.15; 358/1.14; 358/1.16; 710/15
(58) Field of Classification Search
USPC ........................ 358/1.14, 1.15, 1.16; 710/15
See application file for complete search history.

(56) References Cited

U.S. PATENT DOCUMENTS

| 8,190,791 B2 * | 5/2012 | Imai et al. ........................ 710/15 |
| 2008/0186527 A1 * | 8/2008 | Eguchi et al. ................ 358/1.14 |
| 2009/0080013 A1 * | 3/2009 | Sato et al. ..................... 358/1.15 |
| 2009/0285115 A1 * | 11/2009 | Sakai ............................. 370/252 |
| 2010/0073713 A1 * | 3/2010 | Chae ............................. 358/1.15 |
| 2010/0079793 A1 * | 4/2010 | Nishikawa .................... 358/1.15 |
| 2010/0198967 A1 * | 8/2010 | Takahashi ..................... 709/224 |

FOREIGN PATENT DOCUMENTS

JP    2002-268848 A    9/2002

* cited by examiner

*Primary Examiner* — Allen H Nguyen
(74) *Attorney, Agent, or Firm* — Sughrue Mion, PLLC

(57) ABSTRACT

An image forming apparatus includes: a deciding unit that decides whether in-monitoring assertion information representing is recorded in the information storing unit by another image forming apparatus or not; a recording unit that generates new in-monitoring assertion information; an acquiring unit that acquires information to be an image forming target; and an executing unit that executes an image formation processing. The recording unit decides that the condition of the expiration is satisfied when an expiration date represented by information indicative of the expiration date elapses if the information is included in the in-monitoring assertion information recorded by the another image forming apparatus, and the recording unit does not generate the in-monitoring assertion information and the executing unit does not execute the image formation processing in that case when the predetermined condition of the expiration is not satisfied.

3 Claims, 7 Drawing Sheets

FIG. 6

This storage place is being monitored
by another image forming apparatus.
It is impossible to carry out setting.

| OPERATION | TERM |
|---|---|
| POWER SAVING STANDBY | xxxxx |
| NORMAL OPERATION | yyyyy |
| REBOOTING | xxxxx |
| ⋮ | ⋮ |

US 8,643,878 B2

IMAGE FORMING APPARATUS, INFORMATION PROCESSING APPARATUS, COMPUTER READABLE MEDIUM AND IMAGE FORMING SYSTEM

CROSS-REFERENCE TO RELATED APPLICATION

This application is based on and claims priority under 35 USC 119 from Japanese Patent Application No. 2010-068140 filed on Mar. 24, 2010.

BACKGROUND

Technical Field

The present invention relates to an image forming apparatus, an information processing apparatus, a computer readable medium and an image forming system.

SUMMARY

According to an aspect of the invention, an image forming apparatus includes: a deciding unit that decides whether in-monitoring assertion information representing that an information storing unit connected through a communicating unit and storing information is being monitored is recorded in the information storing unit by another image forming apparatus or not; a recording unit that generates new in-monitoring assertion information and records the same information in the information storing unit if the deciding unit decides that the in-monitoring assertion information is not recorded in the information storing unit by the another image forming apparatus or if the in-monitoring assertion information recorded by the another image forming apparatus satisfies a predetermined condition of an expiration; an acquiring unit that acquires information to be an image forming target held by the information storing unit recording the new in-monitoring assertion information through the recording unit; and an executing unit that executes an image formation processing based on the information to be the image forming target which is acquired by the acquiring unit, wherein the recording unit decides that the condition of the expiration is satisfied when an expiration date represented by information indicative of the expiration date elapses if the information is included in the in-monitoring assertion information recorded by the another image forming apparatus, and the recording unit does not generate the in-monitoring assertion information and the executing unit does not execute the image formation processing in that case when the predetermined condition of the expiration is not satisfied if the deciding unit decides that the in-monitoring assertion information is recorded by the another image forming apparatus.

BRIEF DESCRIPTION OF THE DRAWINGS

Embodiments of the invention will be described in detail based on the following figures, wherein:

FIG. 6 is an explanatory view showing an example of an alarm displayed by the image forming apparatus according to the embodiment of the invention, FIG. 8 is an explanatory view showing an example of a content of a term setting database which may be held by the image forming apparatus according to the embodiment of the invention.

DETAILED DESCRIPTION

Figure 1:
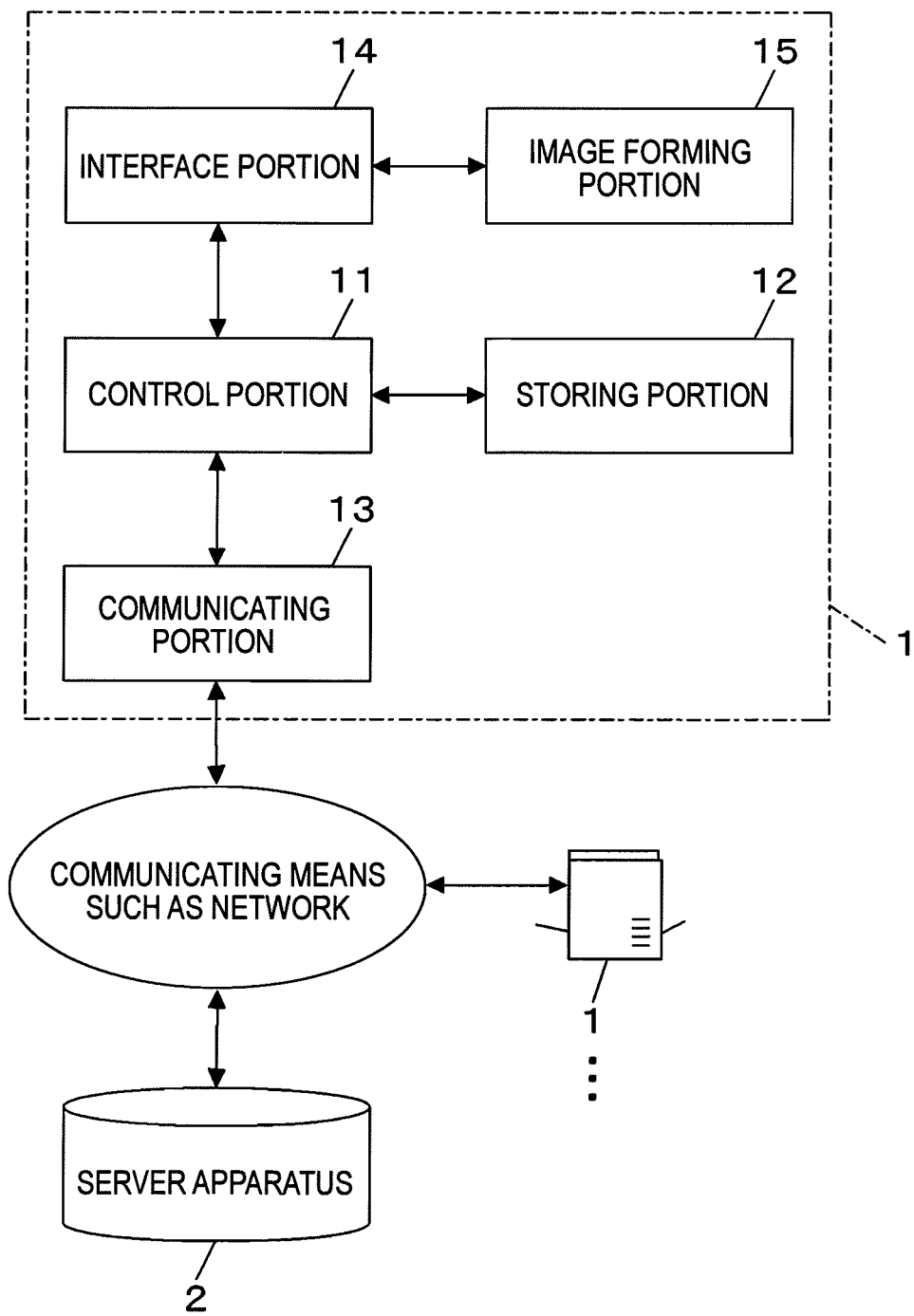
FIG. 1 is a block diagram showing an example of a structure and an example of a connection in an image forming apparatus according to an embodiment of the invention.

An embodiment according to the invention will be described with reference to the drawings. As is illustrated in FIG. 1, an image forming apparatus 1 according to the embodiment of the invention is constituted to include a control portion 11, a storing portion 12, a communicating portion 13, an interface portion 14 and an image forming portion 15, and is connected to a server apparatus 2 through communicating means such as a network. Plural of image forming apparatuses 1 capable of giving access to the server apparatus 2 may be connected through the communicating means such as the network.

The control portion 11 of the image forming apparatus 1 is a program control device such as a CPU (Central Processing Unit) and is operated in accordance with a program stored in the storing portion 12. In the embodiment, the control portion 11 gives access to the server apparatus 2 through the communicating portion 13 and decides whether in-monitoring assertion information representing that the server apparatus 2 is being monitored is recorded by another image forming apparatus 1 or not. In the case in which the in-monitoring assertion information is not recorded in the server apparatus 2 by the another image forming apparatus 1 or the case in which the in-monitoring assertion information recorded by the another image forming apparatus 1 satisfies a predetermined condition of an expiration, the control portion 11 generates new in-monitoring assertion information and records the same information in the server apparatus 2. Then, the image forming portion 15 is controlled to acquire information to be an image forming target held by the server apparatus 2 recording the new in-monitoring assertion information and to execute an image formation processing based on the information to be the image forming target thus acquired. The contents of a detailed processing in the control portion 11 will be described below.

The storing portion 12 is a memory device and holds a program to be executed by the control portion 11. The program is stored in a computer readable recording medium such as a DVD-ROM (Digital Versatile Disc Read Only Memory) and is thus offered, and may be stored in the storing portion 12. Moreover, the storing portion 12 is also operated as a work memory of the control portion 11.

The communicating portion 13 is a network interface and gives access to the server apparatus 2 through the communicating means such as the network in accordance with an instruction sent from the control portion 11. The interface portion 14 transmits the instruction input from the control portion 11 to the image forming portion 15. Moreover, the interface portion 14 transmits, to the control portion 11, information output from the image forming portion 15. The image forming portion 15 is a printer device, for example, and forms an image on a medium such as a paper in accordance with the instruction input from the control portion 11.

The server apparatus 2 is a file server, for example, and is constituted to include a storage device serving as information storing means. The server apparatus 2 accepts in-monitoring assertion information upon receipt of access from the image forming apparatus 1, and records the in-monitoring assertion information thus accepted in the storage device. Furthermore, the server apparatus 2 accepts information to be an image forming target (image forming information) from a client apparatus (a personal computer) which is not shown, and records the image forming information in the storage device.

Upon receipt of a request for the in-monitoring assertion information or the image forming information from the image forming apparatus 1, moreover, the server apparatus 2 transmits, to the image forming apparatus 1 to be a request source, the in-monitoring assertion information or image forming information thus requested.

In a certain example according to the embodiment, a file system having a hierarchical directory structure is formed in the storage device of the server apparatus 2. A specific directory (folder) set into the file system is set to be a directory for holding the image forming information. The directory is set to be accessible by the image forming apparatus 1 which is authenticated, for example.

Moreover, the in-monitoring assertion information recorded by the image forming apparatus 1 in the embodiment is a file having a file name which is preset to represent the in-monitoring assertion information, and the file is assumed to include a character string indicating which image forming apparatus 1 records the in-monitoring assertion information (identification information about a recording source).

However, the embodiment is not restricted to the example but it is sufficient that the in-monitoring assertion information is a file including specific information in a header portion and any of the image forming apparatuses 1 which records the information may be identified.

Figure 2:
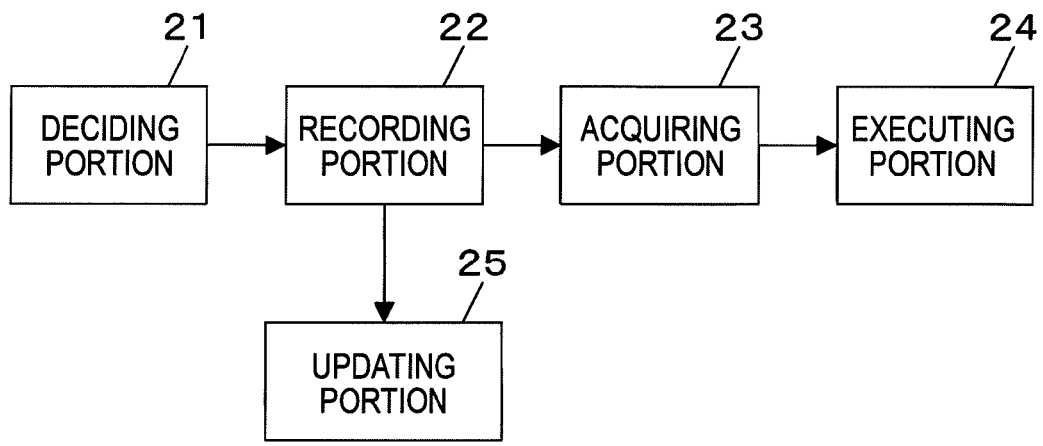
FIG. 2 is a functional block diagram showing an example of the image forming apparatus according to the embodiment of the invention.

Next, an operation of the control portion 11 will be described. The control portion 11 of the image forming apparatus 1 according to the embodiment functionally includes a deciding portion 21, a recording portion 22, an acquiring portion 23, an executing portion 24 and an updating portion 25 as is illustrated in FIG. 2. Moreover, it is assumed that the control portion 11 previously accepts an input of reference information (URL: Uniform Resource Locator) such as a directory of the server apparatus 2 to be an acquiring source of image forming information from a user and holds the reference information in the storing portion 12.

The deciding portion 21 reads, from the storing portion 12, the reference information about the acquiring source of the image forming information which is previously accepted, and gives a request for information held in a place representing the reference information through the communicating means such as the network. The set reference information indicates storing means in the server apparatus 2. Therefore, the deciding portion 21 transmits the request to the server apparatus 2. The deciding portion 21 accepts a response to the request from the server apparatus 2 and decides whether the in-monitoring assertion information representing that the acquiring source of the information indicated by the reference information is being monitored is recorded by another image forming apparatus 1 or not.

For example, the deciding portion 21 requires a file name list in a folder indicated by the reference information as the request. Then, the deciding portion 21 checks whether a predetermined file name is included as a file name representing the in-monitoring assertion information in the file name list received from the server apparatus 2 or not. If the file name is not included, information representing the purport is output to the recording portion 22.

If the file name representing the in-monitoring assertion information is included in the file name list received from the server apparatus 2, moreover, the deciding portion 21 acquires the in-monitoring assertion information indicated by the file name. Thereafter, the deciding portion 21 checks whether the in-monitoring assertion information has been recorded by itself or not with reference to identification information about a recording source which is included in the acquired in-monitoring assertion information. The deciding portion 21 outputs, to the recording portion 22, a result of the decision as to whether the acquired in-monitoring assertion information has been recorded by itself or not.

The recording portion 22 accepts the information input from the deciding portion 21 and checks whether or not the information corresponds to either (1) the case in which the in-monitoring assertion information is not recorded on the acquiring source of the image forming information indicated by reference information which is previously specified, or (2) the case in which the in-monitoring assertion information is recorded and has been recorded by itself (that is, the in-monitoring assertion information has not been recorded by another image forming apparatus).

The recording portion 22 further checks whether a predetermined condition of an expiration is satisfied or not by referring to the content of the in-monitoring assertion information acquired by the deciding portion 21 if the information corresponds to neither of the cases. When deciding that the condition of the expiration is not satisfied, the recording portion 22 interrupts the processing.

In the case in which the information corresponds to either the case (1) or (2) or the in-monitoring assertion information acquired by the deciding portion 21 satisfies the predetermined condition of the expiration, moreover, the recording portion 22 generates new in-monitoring assertion information and transmits, to the server apparatus 2, the in-monitoring assertion information together with a request for recording the in-monitoring assertion information in the acquiring source of the image forming information indicated by the reference information.

The condition of the expiration indicates that an expiration date represented by the information elapses if information indicating the expiration date is included in the in-monitoring assertion information acquired by the deciding portion 21, for example.

In other words, although the image forming apparatus 1 according to the embodiment records its own in-monitoring assertion information for the acquiring source of the image forming information and acquires the image forming information from the acquiring source, the in-monitoring assertion information includes information representing an expiration date. The image forming apparatus 1 generates new in-monitoring assertion information till the expiration date and records the same information by the updating portion 25 which will be described below (an update processing). In the case in which a power supply of the apparatus is turned OFF or the processing for updating the in-monitoring assertion information may not be executed due to some failure, the in-monitoring assertion information expires on arrival of the term and monitoring may be carried out by another image forming apparatus 1.

Figure 3:
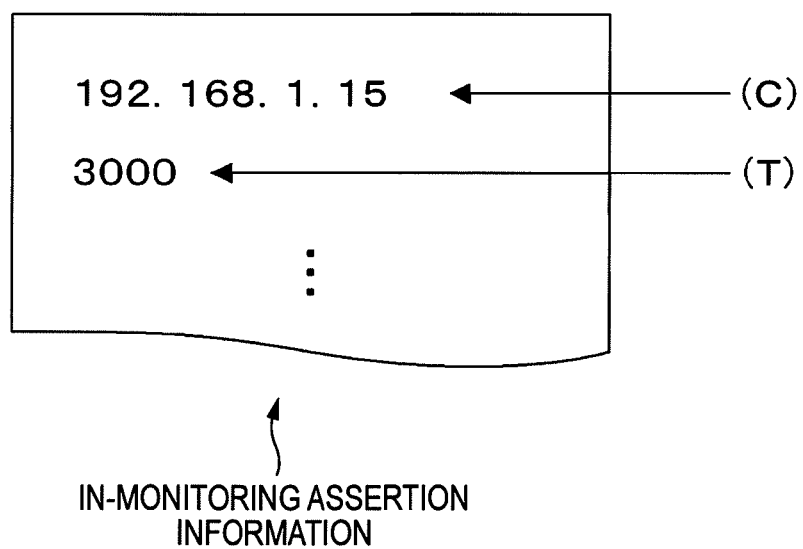
FIG. 3 is an explanatory view showing an example of in-monitoring assertion information which is generated by the image forming apparatus according to the embodiment of the invention.

In the certain example according to the embodiment, accordingly, the recording portion 22 includes information (recording source specifying information) C representing that the in-monitoring assertion information is recorded by itself and information T representing an expiration date in the in-monitoring assertion information generated by itself as is illustrated in FIG. 3. The recording source specifying information is set to be information capable of identifying the image forming apparatus 1, for example, a network address (an IP (Internet Protocol) address) of the image forming apparatus 1 giving an instruction for recording.

As an example, moreover, the server apparatus 2 reads information about a date and time from timer means (a calendar IC (Integrated Circuit)) (not shown) provided by the server apparatus 2 itself and transmits the same information to the image forming apparatus 1 to be a request source in response to a request given from the image forming apparatus 1. When generating the in-monitoring assertion information, the image forming apparatus 1 gives the server apparatus 2 a request for the information about the date and time and adds a predetermined time to the information about the date and time which is received as a response to the request, and thus generates information designating an expiration date (absolute designation) and records the same information to be included as the information (T) about the expiration date in the in-monitoring assertion information.

Also in the case in which the condition of the expiration is decided, furthermore, the image forming apparatus 1 gives a request for the information about the date and time to the server apparatus 2 and compares the information about the date and time which is received as a response to the request with the information about the expiration date which is included in the in-monitoring assertion information and is a target for deciding whether the expiration is reached or not, thereby checking whether the expiration date elapses or not.

As a further example, it is also possible to use, as the information about the expiration date, an elapsed time (relative designation) after the in-monitoring assertion information is recorded. For instance, in the case in which the information about the expiration date is recorded to be "3000", it is implied that the expiration date is reached in 3000 seconds (50 minutes) after the in-monitoring assertion information is recorded. In this case, the server apparatus 2 relates and records information about a date and time (which is read from the timer means (not shown) and is thus acquired as described above) at time of an operation for recording the in-monitoring assertion information. The image forming apparatus 1 gives the server apparatus 2 a request for information about a date and time (information about a current date and time) and information about a date and time that the in-monitoring assertion information to be the target for deciding whether the expiration is reached or not is recorded (information about a recording date and time) when deciding the condition of the expiration. Moreover, the image forming apparatus 1 adds an elapsed time represented by the information about the expiration date which is included in the in-monitoring assertion information to be the target for deciding whether the expiration is reached or not to the information about the recording date and time which is received as a response to the request, thereby calculating the expiration date. Then, the image forming apparatus 1 compares the expiration date thus calculated with the information about the current date and time which is acquired from the server apparatus 2, thereby checking whether the expiration date elapses or not.

When the recording portion 22 records the new in-monitoring assertion information, the acquiring portion 23 acquires the image forming information to be the image forming target held in the acquiring source of the image forming information represented by the reference information of the server apparatus 2, and outputs the image forming information to the executing portion 24.

The executing portion 24 controls the image forming portion 15 in order to execute an image formation processing based on the image forming information acquired by the acquiring portion 23. Since the operation is the same as that of a normal printer, detailed description will be omitted.

The updating portion 25 executes an update processing for newly generating in-monitoring assertion information and recording the in-monitoring assertion information in the server apparatus 2 repetitively in a predetermined timing after the recording portion 22 records the new in-monitoring assertion information in advance. In the same manner as the recording portion 22, the updating portion 25 also generates in-monitoring assertion information including the information (recording source specifying information) C representing its own recording operation and the information T representing the expiration date and records the in-monitoring assertion information in the server apparatus 2. It is sufficient that a method of generating the information T representing the expiration date is carried out in the same manner as in the recording portion 22, which has been described above.

In the case in which the information T representing the expiration date which is included in the new in-monitoring assertion information recorded by the recording portion 22 in advance is indicated by an elapsed time after a date and time that the in-monitoring assertion information is recorded (the relative designation), the updating portion 25 does not newly generate the in-monitoring assertion information but may transmit, to the server apparatus 2, an instruction for updating, into a current date and time, the recording date and time for the in-monitoring assertion information which is currently recorded. In this case, the server apparatus 2 updates, into a current date and time, the recording date and time for the in-monitoring assertion information which is recorded based on the instruction (the processing is the same as a result of an execution of a touch command in UNIX (registered trademark, for example).

Figure 4:
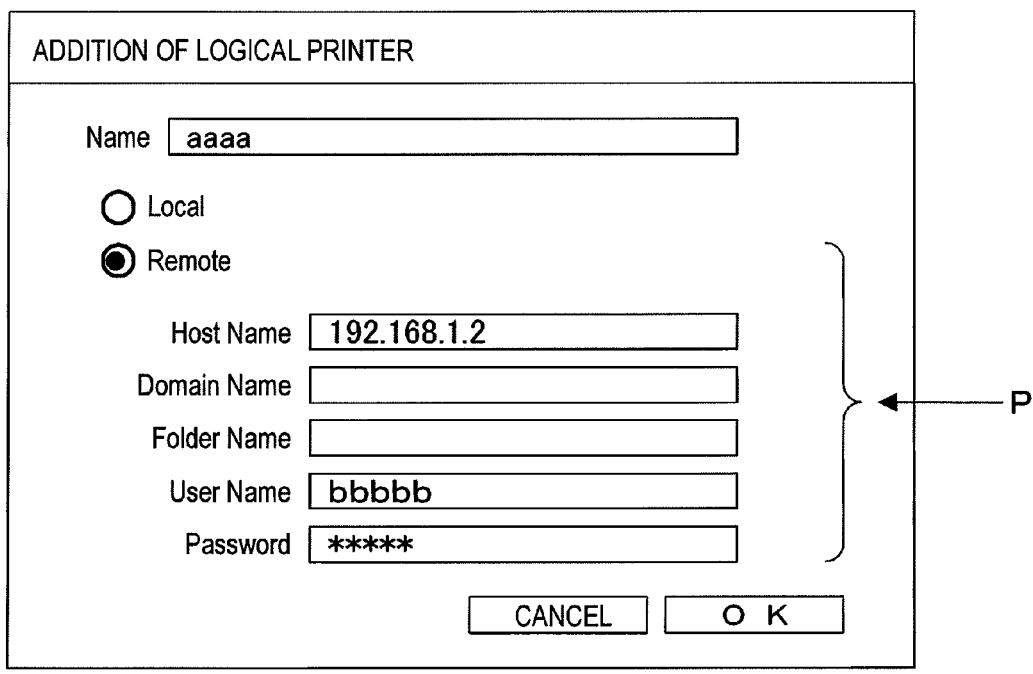
FIG. 4 is an explanatory view showing an example of an interface screen offered by the image forming apparatus according to the embodiment of the invention.

The image forming apparatus 1 according to the embodiment has the structure described above, and is operated as will be described below. The image forming apparatus 1 presents an interface screen illustrated in FIG. 4 and accepts an input of the reference information (URL: Uniform Resource Locator) such as the directory of the server apparatus 2 to be the acquiring source for the image forming information in accordance with an instruction given from a user over the interface screen before starting a processing for acquiring the image forming information. In the interface screen shown in FIG. 4, in the case in which information to be an image forming target is acquired through the communicating means such as the network, the reference information is set based on a host name, a domain name or a folder name which is the acquiring source (P). In other words, the URL (Uniform Recourse Locator) is obtained by coupling the domain name, the host name (or a network address such as an IP (Internet Protocol) address as shown in FIG. 4) and the folder name. In the interface screen shown in FIG. 4, moreover, in the case in which an authentication is carried out in the server apparatus 2, it is possible to preset information about a user name or a password which is required from the server apparatus 2 when giving access to a storage place represented by the reference information (P).

The image forming apparatus 1 stores the input information and starts a next processing by receiving an instruction for starting a processing for acquiring the image forming information from the user.

Figure 5:
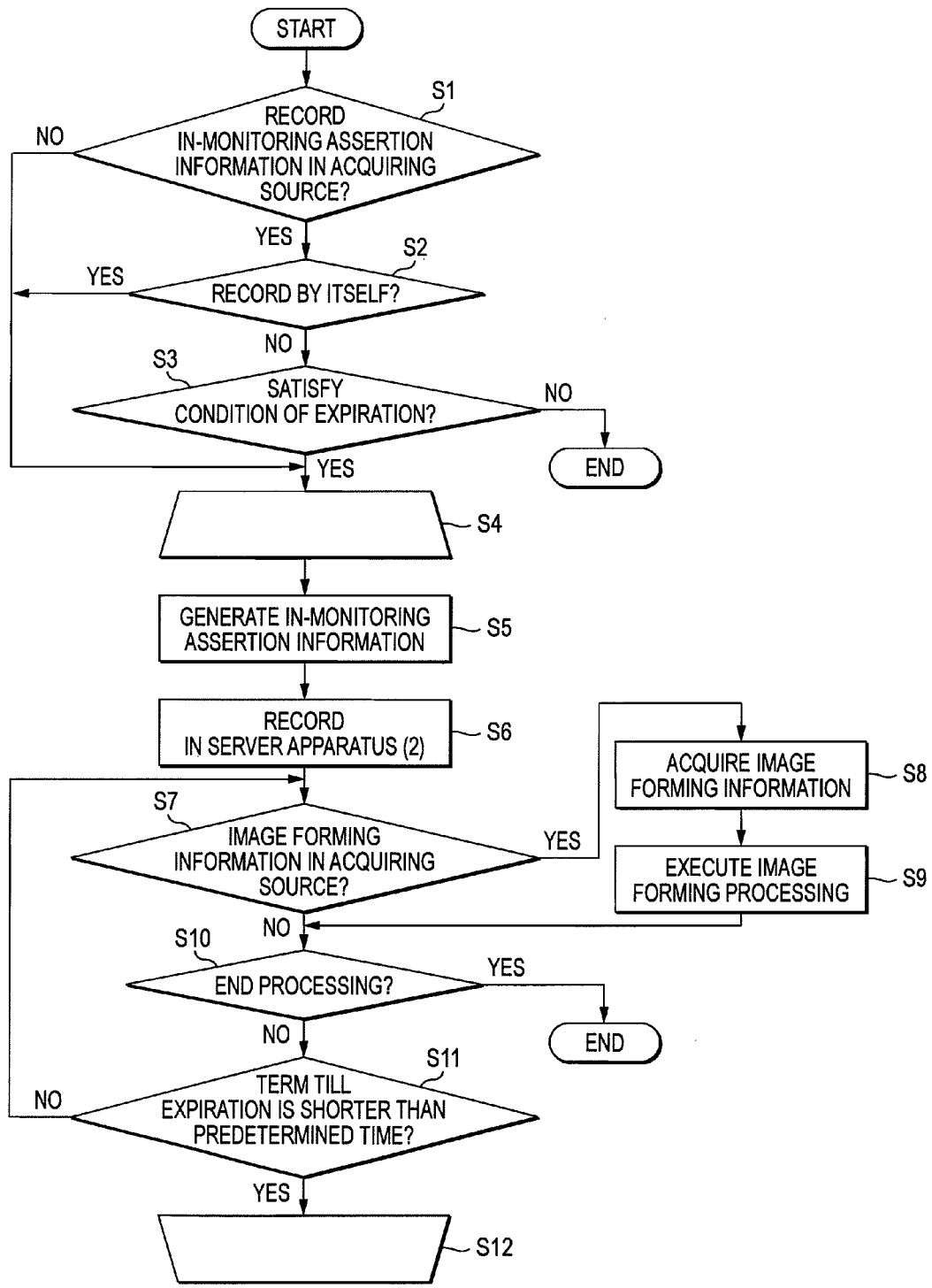
FIG. 5 is a flowchart showing an example of an operation of the image forming apparatus according to the embodiment of the invention.

As is illustrated in FIG. 5, the image forming apparatus 1 checks whether in-monitoring assertion information is recorded in a storage place indicated by stored reference information or not (S1). At this time, in the case in which an authentication is carried out in the server apparatus 2, the image forming apparatus 1 executes a processing for receiving the authentication by transmitting, to the server apparatus 2, a user name or a password which is previously input.

The image forming apparatus 1 checks a content of the in-monitoring assertion information if the in-monitoring assertion information is recorded (Yes) in the processing S1, and decides whether the in-monitoring assertion information is recorded by the image forming apparatus 1 itself or not (S2). If the in-monitoring assertion information is not recorded by the image forming apparatus 1 itself (No), the image forming apparatus 1 further decides whether an expiration date is reached or not by referring to information about the expiration date which is included in the in-monitoring assertion information (S3).

If the image forming apparatus 1 decides that the expiration date is not reached (No) in the processing S3, a message of an alarm (for example, FIG. 6) is displayed to the user so that the processing is ended.

If the in-monitoring assertion information is recorded by the image informing apparatus 1 itself (Yes) in the processing S2 or the expiration date is reached (Yes) in the processing S3, moreover, the image forming apparatus 1 starts a repetition processing (S4: Start a loop). Then, the image forming apparatus 1 generates new in-monitoring assertion information (S5). In this case, the image forming apparatus 1 includes, in the in-monitoring assertion information, information representing that the in-monitoring assertion information is recorded by the image informing apparatus 1 itself and information representing the expiration date. A request is given to the server apparatus 2 in order to record the generated in-monitoring assertion information on a storage place in the server apparatus 2 which is indicated by the reference information (an acquiring source for the image forming information) (S6).

The image forming apparatus 1 checks whether the image forming information is recorded in the acquiring source for the image forming information which records the in-monitoring assertion information or not (S7). If the image forming information is recorded (Yes), it is acquired (in recording order if plural of image forming information is recorded, for example) (S8) and an image formation processing is executed (S9).

The image forming apparatus 1 further decides whether an instruction for an end is received or not (S10). If the instruction for the end is received (Yes), the processing is ended. If the instruction for the end is not received, moreover, the image forming apparatus 1 checks whether or not a time left till the expiration date which is included in the in-monitoring assertion information recorded in advance is shorter than a predetermined time or the expiration date elapses (the expiration date does not elapse and the left time is longer than the predetermined time) (S11).

If it is decided that the time left till the expiration date which is included in the in-monitoring assertion information recorded in advance is shorter than the predetermined time or the expiration date elapses (Yes), the image forming apparatus 1 repeats a loop (S12: End the loop). If it is decided that the expiration date does not elapse and the left time is longer than the predetermined time in the processing S11 (No in the processing S11), moreover, the image forming apparatus 1 proceeds to the processing S7 and continuously executes the processing.

When the processing is ended upon receipt of the instruction for the end in the processing S10, it is also possible to give the server apparatus 2 a request for deleting the in-monitoring assertion information recorded in the acquiring source for the image forming information. If the in-monitoring assertion information is not recorded (No) in the processing 51, furthermore, the image forming apparatus 1 proceeds to the processing S4 and continuously executes the processing.

Figure 7:
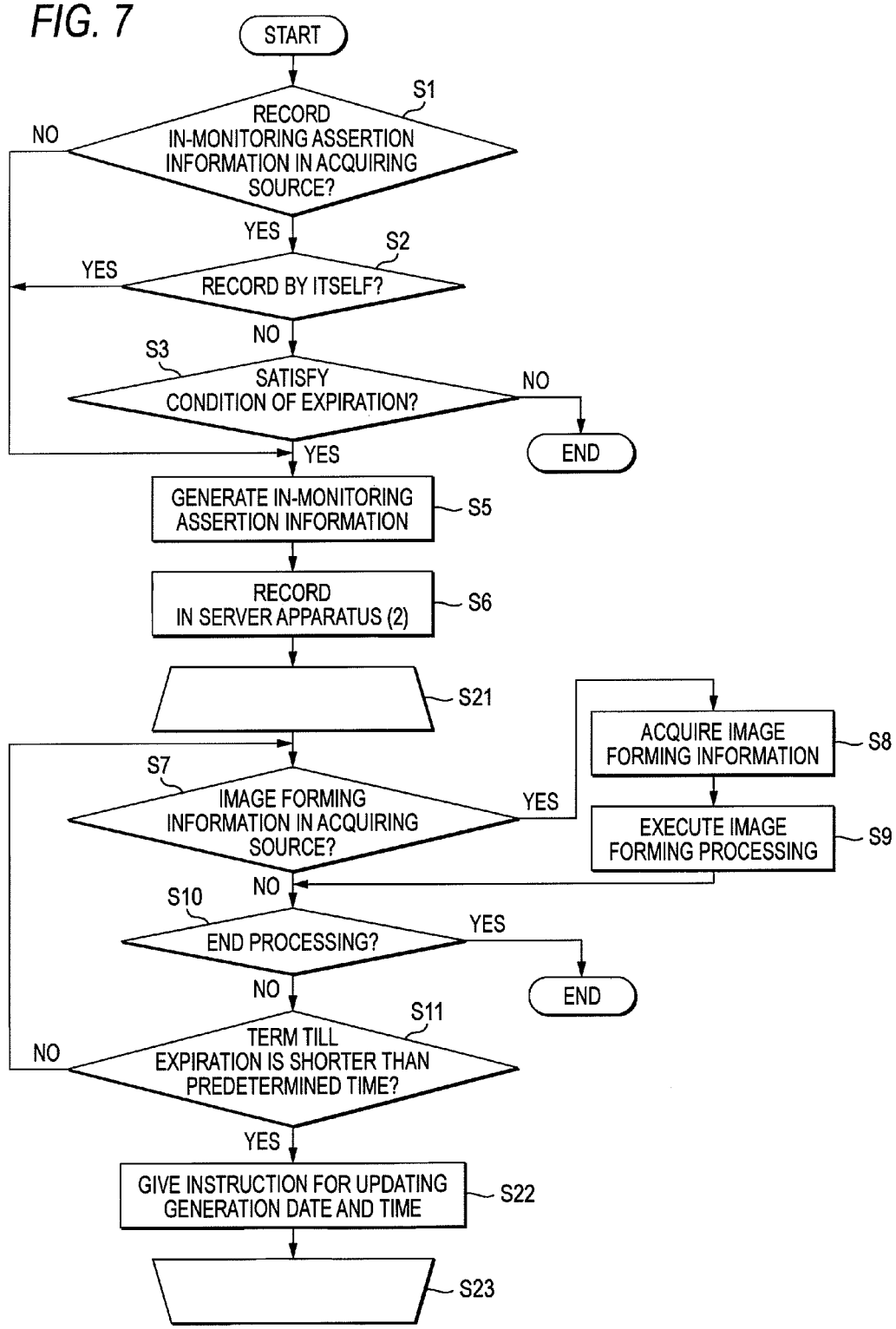
FIG. 7 is a flowchart showing another example of the operation of the image forming apparatus according to the embodiment of the invention.

In addition, in the case in which the information (T) about the expiration date which is included in the in-monitoring assertion information is relatively designated, that is, is expressed in an elapsed time after the date and time that the in-monitoring assertion information is recorded, an operation may be carried out in the following manner. More specifically, in place of the processing shown in FIG. 5, the image forming apparatus 1 checks whether the in-monitoring assertion information is recorded in the storage place indicated by the stored reference information or not as is illustrated in FIG. 7 (S1). At this time, in the case in which an authentication is carried out in the server apparatus 2, the image forming apparatus 1 executes a processing for receiving the authentication by transmitting, to the server apparatus 2, a user name or a password which is previously input.

The image forming apparatus 1 checks a content of the in-monitoring assertion information if the in-monitoring assertion information is recorded (Yes) in the processing S1, and decides whether the in-monitoring assertion information is recorded by the image forming apparatus 1 itself or not (S2). If the in-monitoring assertion information is not recorded by the image forming apparatus 1 itself (No), the image forming apparatus 1 further decides whether an expiration date is reached or not by referring to information about the expiration date which is included in the in-monitoring assertion information (S3).

If the image forming apparatus 1 decides that the expiration date is not reached (No) in the processing S3, a message of an alarm (for example, FIG. 6) is displayed to the user so that the processing is thus ended.

If the in-monitoring assertion information is recorded by the image informing apparatus 1 itself (Yes) in the processing S2 or the expiration date is reached (Yes) in the processing S3, moreover, the image forming apparatus 1 generates new in-monitoring assertion information (S5). In this case, the image forming apparatus 1 includes, in the in-monitoring assertion information, information representing that the in-monitoring assertion information is recorded by the image forming apparatus 1 itself and information representing the expiration date. A request is given to the server apparatus 2 in order to record the generated in-monitoring assertion information on a storage place in the server apparatus 2 which is indicated by the reference information (an acquiring source for the image forming information) (S6).

The image forming apparatus 1 starts a repetition processing (S21: Start a loop). Then, the image forming apparatus 1 checks whether the image forming information is recorded in the acquiring source for the image forming information which records the in-monitoring assertion information or not (S7). If the image forming information is recorded (Yes), it is acquired (in recording order if plural of image forming information is recorded, for example) (S8) and an image formation processing is executed (S9).

The image forming apparatus 1 further decides whether an instruction for an end is received or not (S10). If the instruction for the end is received (Yes), the processing is ended. If the instruction for the end is not received, moreover, the image forming apparatus 1 decides whether or not a time left till the expiration date which is included in the in-monitoring assertion information recorded in advance is shorter than a predetermined time or the expiration date elapses (the expiration date does not elapse and the left time is longer than the predetermined time) (S11).

If it is decided that the time left till the expiration date which is included in the in-monitoring assertion information recorded in advance is shorter than the predetermined time or the expiration date elapses (Yes), the image forming apparatus 1 gives the server apparatus 2 an instruction for setting a date and time that the in-monitoring assertion information is generated into a current date and time (S22) and repeats a loop (S23: End the loop).

If it is decided that the expiration date does not elapse and the left time is longer than the predetermined time in the processing S11 (No in the processing S11), moreover, the image forming apparatus 1 proceeds to the processing S7 and continuously executes the processing. Also in this case, when the processing is to be ended upon receipt of the instruction for the end in the processing S10, it is also possible to give the server apparatus 2 a request for deleting the in-monitoring assertion information recorded in the acquiring source for the image forming information. If the in-monitoring assertion information is not recorded (No) in the processing S1, furthermore, the image forming apparatus 1 proceeds to the processing S5 and continuously executes the processing.

The image formation processing in the processing S9 of FIGS. 5 and 7 may be executed in a background through the control portion 11 (that is, simultaneously with the processing in FIG. 5 or FIG. 7).

[Countermeasure Against Situation of Apparatus]

The in-monitoring assertion information may include information such as a character string indicative of a situation of an apparatus. More specifically, in the case in which the image forming apparatus 1 is rebooted for some reason, it generates new in-monitoring assertion information before the rebooting and records the same information in the server apparatus 2 irrespective of whether a time left till an expiration date of in-monitoring assertion information which is finally recorded is shorter than a predetermined time. In this case, the recording source specifying information C representing to be generated and recorded by the image forming apparatus 1 itself, the information T representing the expiration date and information S representing that the rebooting operation is being carried out (for example, a character string of "reboot") are included as a content of the new in-monitoring assertion information generated before the rebooting operation.

In this case, the image forming apparatus 1 for executing the processing shown in FIG. 5 or FIG. 7 decides whether the expiration date is reached or not and decides whether the information representing the situation of the apparatus such as a character string indicating that the rebooting operation is being carried out is included in the in-monitoring assertion information or not in the processing S3.

If the information representing the situation of the apparatus is included and satisfies a predetermined condition (for example, a condition "that the information representing the situation of the apparatus is the character string of "reboot"), the image forming apparatus 1 decides that the condition of the expiration is not satisfied irrespective of the expiration date. In other words, it is decided that the expiration date is not reached (No) in the processing S3 so that the message of the alarm (for example, FIG. 6) is displayed to the user and the processing is thus ended.

[Setting of Exclusiveness]

Furthermore, the in-monitoring assertion information may include information such as a character string specified by the user. An example of the information indicates exclusive monitor setting through the specific image forming apparatus 1.

More specifically, in the case in which the user wants the specific image forming apparatus 1 to exclusively monitor an acquiring source for a certain image forming instruction (that is, in such a manner that another image forming apparatus 1 is not caused to acquire the image forming instruction stored in the acquiring source), he (she) presets the image forming apparatus 1 to include information such as a character string representing the purport in the in-monitoring assertion information.

In this case, when the image forming apparatus 1 generates the in-monitoring assertion information, information specified by the user (for example, a character string of "Exclusive" implying that the image forming apparatus 1 is caused to exclusively carry out monitoring) is included in addition to the recording source specifying information C representing to be generated and recorded by the image forming apparatus 1 itself and the information T representing the expiration date.

In this case, the image forming apparatus 1 for executing the processing shown in FIG. 5 or FIG. 7 decides whether the expiration date is reached or not and decides whether information specified by the user is included in the in-monitoring assertion information or not in the processing S3.

If the information is included and satisfies a predetermined condition (for example, a condition of "information specified by a user is a character string of 'Exclusive'" (in other words, the condition is equivalent to a condition that information representing the purport that monitoring is to be carried out by only another image forming apparatus 1 recording the in-monitoring assertion information is included)), the image forming apparatus 1 decides that the condition of the expiration is not satisfied irrespective of the expiration date. In other words, it is decided that the expiration date is not reached (No) in the processing S3 so that the message of the alarm (for example, FIG. 6) is displayed to the user and the processing is thus ended. Moreover, separate information about the expiration date may be added to the information specified by the user. More specifically, the information specified by the user may be a character string of "Exclusive –2d" (which implies that the monitoring is exclusively carried out for two days (2d)). In the case in which the information is included in the in-monitoring assertion information, the image forming apparatus 1 decides that the condition of the expiration is not satisfied irrespective of the information T about the expiration date. However, it is separately decided whether the expiration date included in the information specified by the user elapses or not. If it is decided that the expiration date elapses, the image forming apparatus 1 may decide that the expiration is made.

[Combination]

Moreover, the image forming apparatus 1 may include, in the in-monitoring assertion information, both the information representing the situation of the apparatus and the information specified by the user. In this case, in the processing S3, the image forming apparatus 1 for executing the processing shown in FIG. 5 or FIG. 7 decides whether the expiration date is reached or not and decides whether the information representing the information about the apparatus or the information specified by the user is included in the in-monitoring assertion information or not.

If the information is included and satisfies a predetermined condition (for example, a condition of "a character string of reboot or Exclusive is included"), the image forming apparatus 1 decides that the condition of the expiration is not satisfied irrespective of the expiration date. In other words, it is decided that the expiration date is not reached (No) in the processing S3, and the message of the alarm (for example, FIG. 6) is displayed to the user so that the processing is thus ended.

Moreover, it is also possible to decide whether the condition of the expiration is satisfied or not by a combination of a condition related to the information representing the situation of the apparatus and a condition related to the information specified by the user. For example, in the case in which the information specified by the user is "Exclusive" and the information representing the situation of the apparatus is "In Trouble" as information representing that a stoppage is being carried out due to a failure, the condition of the expiration is treated to be satisfied. When the information specified by the user is not simple "Exclusive" but "Absolutely Exclusive" to be information having the purport that an absolute exclusiveness is required even if the information representing the situation of the apparatus is the "In Trouble", moreover, the condition of the expiration may be treated to be unsatisfied.

[Another Example of Setting of Expiration Date]

In the description, the image forming apparatus 1 serves to set a predetermined term when the information T representing the expiration date is to be set. However, the embodiment is not restricted thereto.

For example, the image forming apparatus 1 may hold, in the storing portion 12, a term setting database including at least one entry (information element) relating information representing an operation of the image forming apparatus 1 to information representing an expiration date and may set the expiration date by referring to the term setting database.

In the image forming apparatus 1, information illustrated in FIG. 8 is held as the term setting database in the storing portion 12, for instance. In FIG. 8, there is shown an example of a term setting database in which numeric values to be information representing a predetermined term are related to information of "power saving standby", "normal operation" and "rebooting" as information representing the operation of the image forming apparatus 1, respectively.

When generating in-monitoring assertion information, the image forming apparatus 1 retrieves an entry related to information representing a current operation (a situation of an apparatus) by referring to the term setting database. Then, there is read a numeric value representing an expiration date which is included in the entry found by the retrieval. The image forming apparatus 1 generates the information T representing the expiration date based on the numeric value thus read and generates in-monitoring assertion information including the information T representing the expiration date thus generated.

The numeric value representing the expiration date should be set to represent an elapsed time till an expiration date since an operation for generating or recording the in-monitoring assertion information, for example. In this case, if the information about the expiration date which is to be included in the in-monitoring assertion information is a value of a specific date and time (absolute designation), the image forming apparatus 1 acquires information about a current date and time from the server apparatus 2, adds the read numeric value to the information about the current date and time thus acquired, and generates the information representing the expiration date, for example. If the information about the expiration date which is to be included in the in-monitoring assertion information is set by an elapsed time from a date and time that the in-monitoring assertion information is recorded (relative designation), moreover, the image forming apparatus 1 exactly sets the read numeric value as the information T representing the expiration date (a conversion of a unit may be carried out if the unit is varied, for example, a numeric value is "minute" though it should be expressed in "second"), thereby generating the in-monitoring assertion information.

In the case in which the term setting database does not have an entry corresponding to the information representing the current operation (the situation of the apparatus), a numeric value representing the expiration date to be set as a default may be set separately.

[Variant]

Moreover, the image forming apparatus 1 according to the embodiment executes a processing for receiving an instruction to start a processing for acquiring image forming information from a user and then deciding whether an acquiring source for the image forming information which is set has in-monitoring assertion information recorded by another image forming apparatus 1 or not.

However, the image forming apparatus 1 may start the processing illustrated in FIG. 5 or FIG. 7 when the user sets reference information over the interface screen shown in FIG. 4.

Although the description has been given by taking the image forming apparatus having the image forming portion as an example, furthermore, the processing according to the embodiment may be executed in an information processing apparatus such as a printer server which is constituted separately from the image forming apparatus.

In other words, in this case, information for giving an instruction for an image formation processing based on image forming information to be a forming target is transmitted and output to the image forming apparatus through communicating means such as a network in place of the execution of the image formation processing in the processing S9 illustrated in FIG. 7. Since the instruction information is a control command for an image formation which is widely known, detailed description will be omitted.

Also in the example, the information processing apparatus does not record the in-monitoring assertion information in the server apparatus 2, and therefore, does not execute a processing for acquiring the image forming information if the condition of the expiration is not satisfied.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a deciding unit that decides whether or not in-monitoring assertion information is recorded by another image forming apparatus connected through a communicating unit, the in-monitoring assertion information representing that an information storing unit for storing information is being monitored;

a recording unit that generates new in-monitoring assertion information and records the new in-monitoring assertion information in the information storing unit, in response to either:

the deciding unit deciding that the in-monitoring assertion information is not recorded in the information storing unit by the another image forming apparatus; or the deciding unit deciding that the in-monitoring assertion information is recorded in the information storing unit by the another image forming apparatus and the in-monitoring assertion information includes an expiration date that is elapsed;

an acquiring unit that acquires information to be an image forming target, the information to be the image forming target being held by the information storing unit; and an executing unit that executes an image formation processing based on the information to be the image forming target which is acquired by the acquiring unit, wherein in response to the deciding unit deciding that the in-monitoring assertion information is recorded in the information storing it by the another image forming apparatus and the in-monitoring assertion information includes an expiration date that is not elapsed, the recording unit does not generate the new in-monitoring assertion information and the executing unit does not execute the image formation processing.

2. A non-transitory computer readable medium storing a program causing a computer to execute a process for forming an image, the process comprising:

deciding whether or not in-monitoring assertion information is recorded in an information storage unit by another forming apparatus, the in-monitoring assertion information representing that the information storing unit connected through a communicating unit is being monitored;

generating new in-monitoring assertion information and recording the new in-monitoring assertion information in the information storing unit, in response to either:

deciding that the in-monitoring assertion information is not recorded in the information storing unit by the another image forming apparatus; or deciding that the in-monitoring assertion information is recorded in the information storing unit by the another image forming apparatus and the in-monitoring assertion information satisfies a predetermined condition of an expiration;

acquiring information to be an image forming target, the information to be the image forming target being held by the information storing unit; and executing an image formation processing based on the information to be the image forming target which is acquired by the acquiring, wherein in response to deciding that the in-monitoring assertion information is recorded by the another image forming apparatus and the predetermined condition of the expiration not being satisfied, the new in-monitoring assertion information is not generated and the executing does not execute the image formation processing.

3. An image forming system including:

an information processing apparatus having an information storing unit for storing information;

a deciding unit that decides whether or not in-monitoring assertion information is recorded by another image forming apparatus or not, the in-monitoring asserting information representing that the information storing unit is being monitored;

a recording unit that generates new in-monitoring assertion information and records the new in-monitoring assertion information in the information storing unit, in response to either:

the deciding unit deciding that the in-monitoring assertion information is not recorded in the information storing unit by the another image forming apparatus; or the deciding unit deciding that the in-monitoring assertion information is recorded in the information storing unit by the another image forming apparatus and the in-monitoring assertion information the in-monitoring assertion information including an expiration date that is not elapsed;

an acquiring unit that acquires information to be an image forming target, the information to be the image forming target being held by the information storing unit; and an executing unit that executes an image formation processing based on the information to be the image forming target which is acquired by the acquiring unit, wherein in response to the deciding unit deciding that the in-monitoring assertion information is recorded in the information storing unit by the another image forming apparatus and the in-monitoring assertion information includes an expiration date that is not elapsed, the recording unit does not generate the new in-monitoring assertion information and the executing unit does not execute the image formation processing.

* * * * *